March 17, 1959   V. E. VISOCKIS, JR   2,877,555
EXTENDED LEVEL LIGHT
Filed March 14, 1955
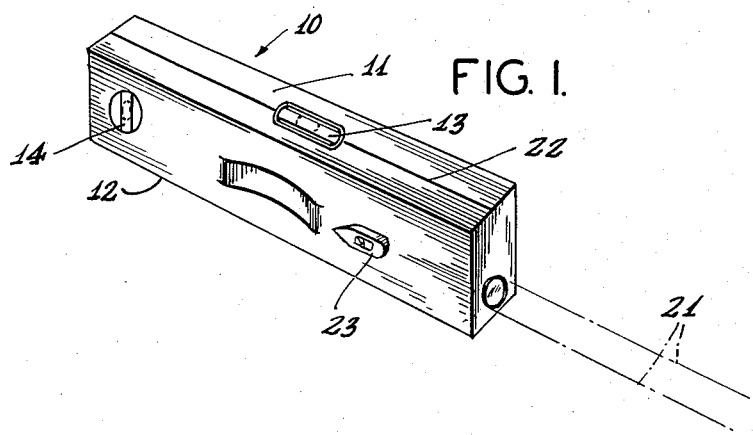
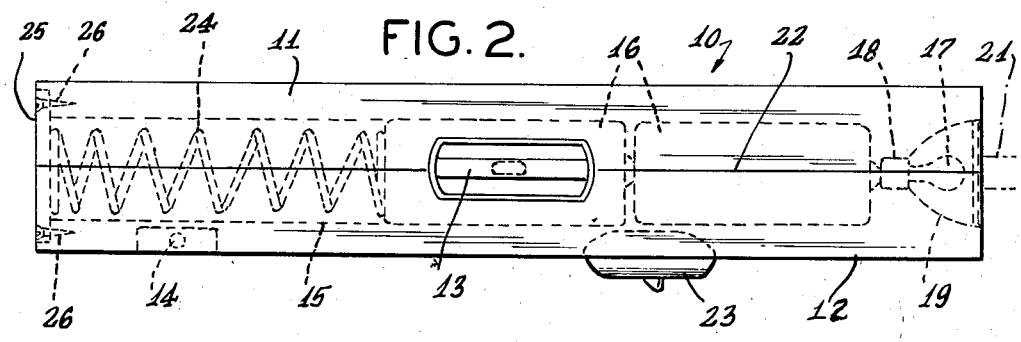
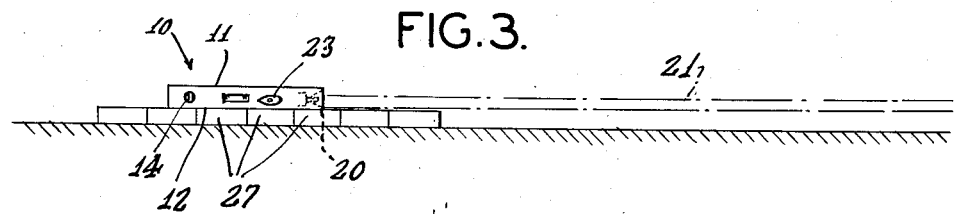
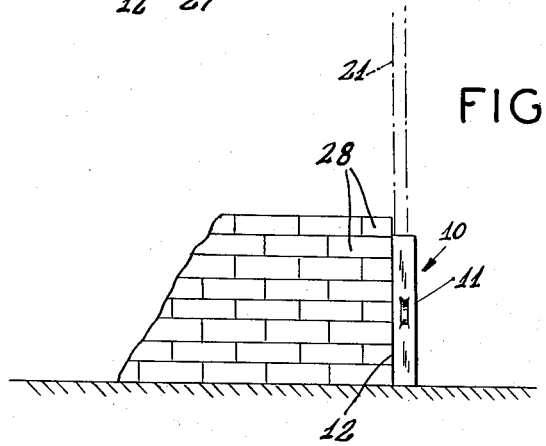
INVENTOR.
VINCENT E. VISOCKIS, JR.
BY
H. G. Manning
ATTORNEY.

United States Patent Office 2,877,555
Patented Mar. 17, 1959

2,877,555

EXTENDED LEVEL LIGHT

Vincent E. Visockis, Jr., Prospect, Conn.

Application March 14, 1955, Serial No. 494,033

1 Claim. (Cl. 33—73)

This invention relates to builder's tools, and more particularly to a device for levels such as are used by carpenters and masons for laying-out foundations, frameworks, and various other structural elements of buildings, etc. It relates more particularly to such a level device whereby a beam of light is utilized to extend the effective length of a builder's level, thereby obviating the continual repositioning of the level in the process of aligning a large number of elements which extend over a distance much greater than the length of the level itself; for example, in the laying of a floor, or in the vertical alignment of a brick wall.

One object of this invention is to provide a device of the above nature in which a light source is provided at one end of a builder's level to project a beam of light outwardly from the end of the level and in substantially adjacent alignment to the working, or reference surface of the level whereby it will provide a reference line extending parallel to the working face of the level.

Another object of this invention is to provide a device of the above nature in which a light source is mounted in a builder's level to project a beam of parallel rays of light so that by orientation of the bubble spirit tube of the level there may be established a reference line extending a distance greater than the length of the level itself.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 is a perspective view of a builder's extended level light embodying the features and principles of this invention.

Fig. 2 is a top plan view on an enlarged scale of the same.

Fig. 3 is a view in elevation, on a smaller scale showing the use of this device to establish a horizontal reference line, as for laying a tile floor.

Fig. 4 is a similar view showing the use of a device of this type to establish a vertical reference line, as when constructing the end of a masonry wall.

Referring now to the drawing, in which like reference numerals denote corresponding parts throughout the several views, the numeral 10 indicates generally an improved builder's level comprising a boxlike frame, or body portion, provided with parallel, flat, upper and lower working surfaces 11 and 12, and having cavities in which are mounted a horizontal bubble spirit tube 13, and a vertical bubble spirit tube 14.

A longitudinal passage 15 is provided within the body 10 to accommodate a pair of series-connected flashlight batteries 16 to furnish current for a light source including a flashlight bulb 17 located in a socket 18 at the focus of a parabolic reflector 19. This reflector is positioned within the body 10 of the level, with its outer edge 20 adjacent to and substantially tangent to the lower working surface 12, to project parallel rays of light outwardly from the end of the level in a path indicated by the broken lines 21, which defines a cylinder of revolution substantially tangent to the plane of the lower surface 12, and whose axis lies in the same vertical plane as the sight line 22 scribed on the upper surface 11.

A switch 23 for controlling the electrical circuit may be located preferably in a recess within the body portion, and wires (not shown) lead to the socket 18 and to a coil spring 24 positioned in the passage 15 behind the batteries 16. A removable cover plate 25, secured by screws 26, permits replacement of the batteries when discharged.

Operation

In order to prepare the improved builder's extended level for use, it will merely be necessary to operate the switch 23 to close the circuit through the batteries and the light bulb 17, whereupon the pencil-like beam 21 of light will be projected from the end of the tool, the lower side of which beam will be in substantial alignment with the lower surface 12 of the level.

If, for example, the device is to be used in the laying of a series of horizontally aligned elements, such as floor tiles 27, as shown in Fig. 3, the level will be placed on several of the tiles, say at one end of the row, and these tiles will be aligned in the usual way by means of the horizontal spirit or bubble tube 13. Additional tiles may then be added to the row (moving toward the right as viewed in Fig. 3) without moving the level from its original position. These additional tiles may be aligned by utilizing the projected light beam 21. All that is necessary is for the workman to insure that the upper face of each tile be positioned just below the level at which the lower edge of the light beam would fall across the upper face of the tile.

Similarly, the device may be used for the vertical alignment of a series of elements, such as masonary units 28 forming the end of a wall, as shown in Fig. 4. The lowermost of these units will first be vertically aligned by abutting them against the working surface 12 of the level, after which the units may be positioned by observation of the vertical spirit tube 14, and succeeding end units of each row may thereafter be vertically aligned by observation of the light beam, it being only necessary to place the end face of each unit in position just to the left (as viewed in Fig. 4) of the position in which the light beam falls across the right hand face of the unit.

While there has been disclosed in this specification, one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a builder's level having a rectangular boxlike frame including at least two elongated parallel flat reference surfaces, a pair of double spirit tubes each respectively oriented to position said reference surfaces in different planes, an electric light source including a parabolic reflector, means to contain a battery and electrical connections including a switch for said light source, said reflector being mounted at one end of said frame to project a pencil-like beam of parallel rays outwardly from said one end of the frame, the lowermost edge of said reflector being positioned substantially tangent to the plane of one of said reference surfaces, whereby the lowermost of said parallel rays projected by said lowermost edge of said reflector defines an extension of said one reference surface.

References Cited in the file of this patent

UNITED STATES PATENTS

| | | |
|---|---|---|
| 999,573 | Lidholm | Aug. 1, 1911 |
| 1,185,978 | Burgess | June 6, 1916 |
| 1,599,122 | Eubank | Sept. 7, 1926 |
| 1,866,600 | Rauch | July 12, 1932 |
| 2,108,475 | Cooper | Feb. 15, 1938 |
| 2,329,864 | Thomas | Sept. 21, 1943 |
| 2,372,494 | Hogan et al. | Mar. 27, 1945 |
| 2,661,653 | Castiglia | Dec. 8, 1953 |

FOREIGN PATENTS

| | | |
|---|---|---|
| 218,457 | Great Britain | July 10, 1924 |